(12) United States Patent
Wu

(10) Patent No.: US 8,096,201 B2
(45) Date of Patent: Jan. 17, 2012

(54) DUSTPROOF DEVICE FOR BALL SCREW APPARATUS

(75) Inventor: Wen Chia Wu, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 411 days.

(21) Appl. No.: 12/454,213

(22) Filed: May 14, 2009

(65) Prior Publication Data

US 2010/0288063 A1  Nov. 18, 2010

(51) Int. Cl.
*F16H 29/20* (2006.01)
(52) U.S. Cl. .......................................... 74/89.4
(58) Field of Classification Search ............ 74/89.23, 74/89.4, 424.71, 424.81
See application file for complete search history.

(56) References Cited

U.S. PATENT DOCUMENTS

| 2,818,745 | A * | 1/1958 | Spontelli ...................... 74/89.4 |
| 6,634,246 | B2 * | 10/2003 | Ohya et al. ................. 74/89.44 |
| 7,278,333 | B2 * | 10/2007 | Kato et al. ................. 74/89.44 |
| 2004/0149059 | A1 * | 8/2004 | Tsukada et al. ............. 74/89.44 |

* cited by examiner

*Primary Examiner* — Vicky Johnson
(74) *Attorney, Agent, or Firm* — Charles E. Baxley

(57) ABSTRACT

A ball screw device includes an elongated screw shaft and a ball nut having helical grooves for receiving ball bearing members, a housing is attached to the ball nut and includes a bore for receiving the screw shaft, and includes one or more slots communicative with the bore of the housing, and one or more wiper members are changeably engaged into the slots of the housing and include a wiper element engaged into the bore of the housing for engaging into the groove of the screw shaft and for removing or wiping off the dirt from the helical groove of the screw shaft and for preventing the ball nut and the screw shaft from being damaged by the dirt.

6 Claims, 7 Drawing Sheets

DUSTPROOF DEVICE FOR BALL SCREW APPARATUS

BACKGROUND OF THE INVENTION

1. Field of the Invention

The present invention relates to a ball screw apparatus, and more particularly to a ball screw apparatus including a dust cap or dustproof device easily and readily attached to the ball nut for suitably shielding the side or end portions of the ball nut and for preventing the dust or dirt from entering into the space between the ball nut and the screw shaft.

2. Description of the Prior Art

Typical ball screw apparatuses or devices comprise two movable members, such as a ball nut and a screw shaft rotatably engaged with each other and rotatable or movable relative to each other, and a number of ball bearing elements disposed between the two movable members for facilitating the sliding or rotational movement between the two movable members.

For example, U.S. Pat. No. 7,278,333 to Kato et al. discloses one of the typical ball screw devices comprising a ball nut pivotally or rotatably coupled onto or threaded with a screw shaft, and a number of loaded ball bearing elements disposed between the screw shaft and the ball nut for facilitating the movement between the screw shaft and the ball nut.

In operation, the screw shaft and the ball nut may rotate relative to each other and may also rotate relative to the ball bearing elements in a great speed such that the space between the ball nut and the screw shaft should be kept clean and should prevent the dust or dirt from entering into the space between the ball nut and the screw shaft and should prevent the ball bearing elements from being damaged by the dust or dirt.

In order to suitably seal the side or end portions of the ball nut, one or more seal rings are required to be engaged into the side or end portions of the ball nut and engaged with the screw shaft for suitably blocking the side or end portions of the ball nut and for preventing the dust or dirt from entering into the space between the ball nut and the screw shaft.

However, the contact or engagement between the seal rings and the ball nut and the screw shaft may increase the friction between the ball nut and the screw shaft, and the seal rings may be easily worn out after use, and the seal rings may not be easily and quickly replaced with the new ones when the seal rings have been worn out or damaged.

The present invention has arisen to mitigate and/or obviate the afore-described disadvantages of the conventional ball screw apparatuses.

SUMMARY OF THE INVENTION

The primary objective of the present invention is to provide a ball screw apparatus including a dust cap or dustproof device easily and readily attached to the ball nut for suitably shielding the side or end portions of the ball nut and for preventing dust or dirt from entering into the space between the ball nut and the screw shaft.

In accordance with one aspect of the invention, there is provided a ball screw apparatus comprising an elongated screw shaft including a helical groove formed on an outer peripheral surface thereof, a ball nut movably attached onto the elongated screw shaft, and including a bore formed therein for receiving the elongated screw shaft, and including a helical groove formed therein for engaging with the helical groove of the screw shaft and for forming an endless ball guiding passage between the screw shaft and the ball nut, a plurality of ball bearing members received in the endless ball guiding passage that is formed between the screw shaft and the ball nut for facilitating a movement between the screw shaft and the ball nut, a housing attached to the ball nut and moved in concert with the ball nut, and including a bore formed therein for receiving the elongated screw shaft, and including a slot formed therein and communicative with the bore of the housing, and a wiper member engaged into the slot of the housing and including a wiper element provided thereon and engaged into the bore of the housing for engaging into the groove of the elongated screw shaft and for wiping off a dirt from the helical groove of the screw shaft and for preventing the dirt from entering into the helical groove of the screw shaft.

The slot of the housing is preferably a radially extended slot for suitably engaging into the helical threaded portions or grooves of the screw shaft and for suitably wiping off the dust or dirt that is engaged into or that enters into the helical threaded portions or grooves of the screw shaft.

The housing includes at least one second slot formed therein and axially spaced from the slot of the housing, or the housing includes a second slot formed therein and disposed and arranged opposite to the slot of the housing and aligned with the slot of the housing for forming a circular structure together with the slot of the housing.

The housing includes a channel formed therein and communicative with the slot of the housing, and the wiper member includes a handgrip aligned with the channel of the housing for being grasped and held by a user.

The housing includes at least one lock notch formed therein and communicative with the slot of the housing, and the wiper member includes a latch extended therefrom for engaging with the lock notch of the housing and for detachably mounting the wiper member to the housing.

The ball nut includes a peripheral recess formed in one side of the ball nut, and the housing includes a peripheral flange extended outwardly from one side of the housing for engaging into the peripheral recess of the ball nut.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
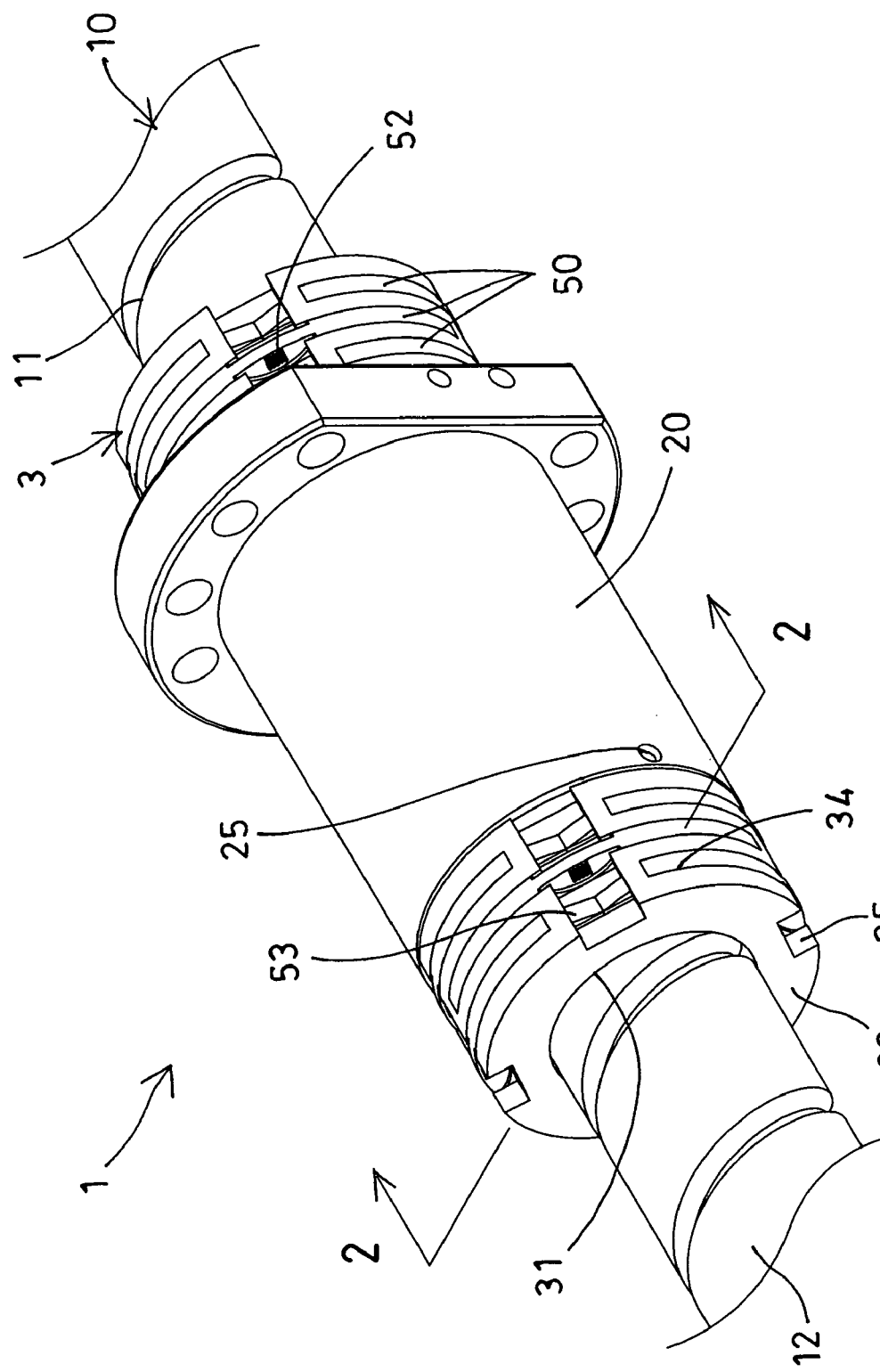
FIG. 1 is a partial perspective view of a ball screw apparatus in accordance with the present invention.
Figure 2:
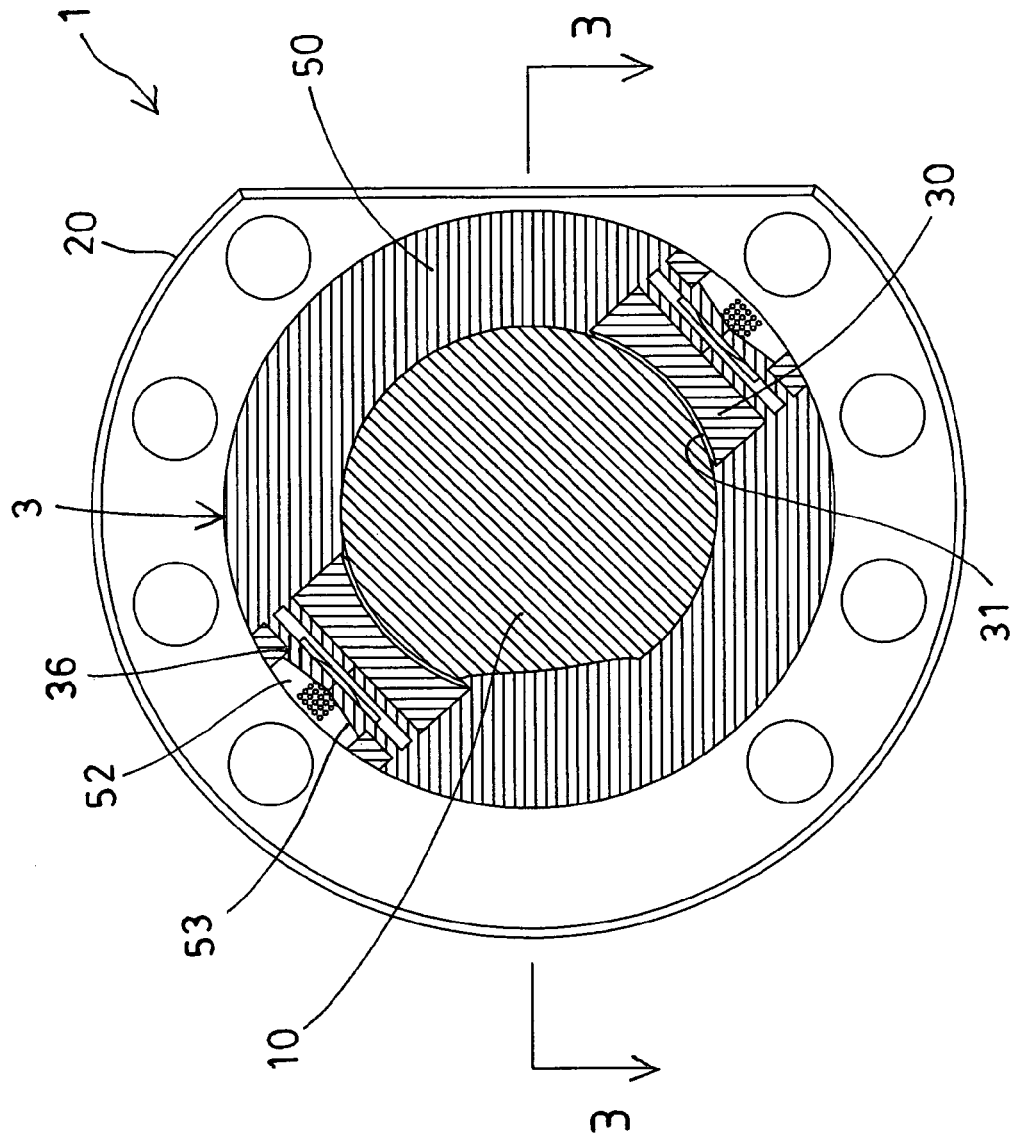
FIG. 2 is a cross sectional view of the ball screw apparatus taken along lines 2-2 of FIG. 1.
Figure 3:
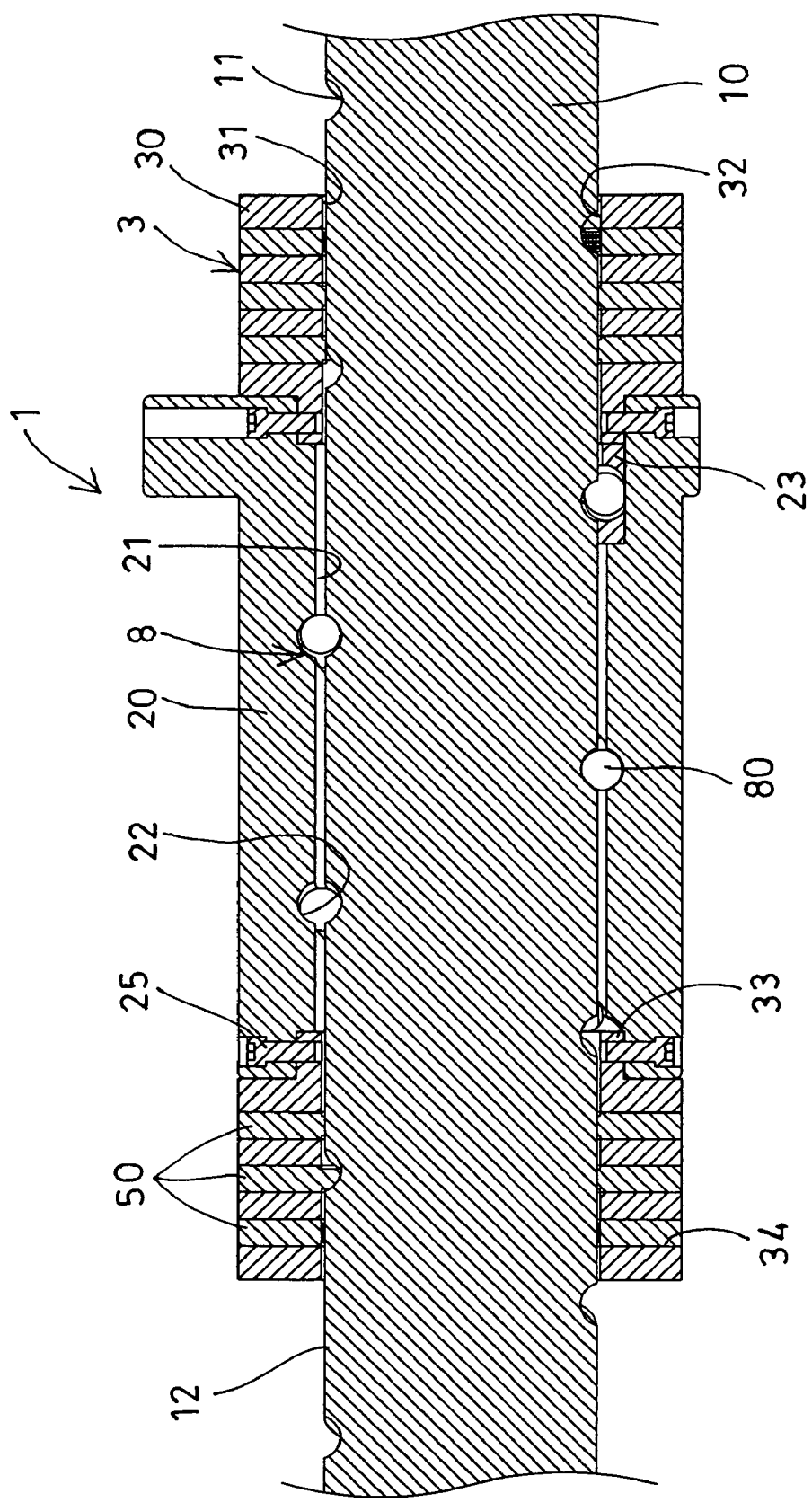
FIG. 3 is a partial cross sectional view of the ball screw apparatus taken along lines 3-3 of FIG. 2.

Referring to the drawings, and initially to FIGS. 1-3, a ball screw apparatus 1 in accordance with the present invention, such as a ball screw device 1, comprises an elongated bolt or screw shaft 10 including a number of helical threaded portions or grooves 11 formed on the outer peripheral portion thereof, or formed in the outer peripheral surface 12 thereof, and a movable member, such as a ball nut 20 including a screw hole 21 formed therein and formed or defined by a number of helical threaded portions or grooves 22 for receiving or engaging with the elongated screw shaft 10, and for threading or engaging with the helical threaded portions or grooves 11 of the screw shaft 10, and for forming one or more endless ball guiding passages 8 in the ball screw device 1 or between the screw shaft 10 and the ball nut 20 and for slidably receiving a number of ball bearing members 80 and for facilitating the sliding or rotational movement between the two movable members 10, 20.

The ball nut 20 may include one or more (such as two) deflectors 23 received or engaged therein for receiving or engaging with the ball bearing members 80 and for guiding or deflecting or returning the ball bearing members 80 to move cyclically in the endless ball guiding passages 8 of the ball screw device 1. The above-described structure is typical and will not be described in further details. The ball screw apparatus 1 in accordance with the present invention further comprises a dustproof device 3 attached or mounted or secured to each of the two side or end portions of the ball nut 20 for suitably shielding the side or end portions of the ball nut 20 and for suitably wiping off the dust or dirt and for preventing the dust or dirt from entering into the space between the ball nut 20 and the screw shaft 10 or into the endless ball guiding passages 8 of the ball screw device 1.

The dustproof devices 3 each include a cylindrical member or an outer housing 30 having a bore 31 formed therein for receiving elongated screw shaft 10, and for allowing the dustproof devices 3 to be attached or disposed on the outer peripheral portion of the screw shaft 10, and for forming a peripheral gap or space 32 between the housing 30 and the screw shaft 10, the ball nut 20 includes an inner peripheral shoulder or recess 24 (FIG. 4) formed in each of the two side or end portions of the ball nut 20, and the housings 30 of the dustproof devices 3 each include a tubular or peripheral flange 33 extended outwardly from one of the two side or end portions of the housing 30 for suitably engaging into the peripheral recess 24 of the ball nut 20 and for solidly securing the housings 30 to the ball nut 20 with latches or fasteners 25, adhesive materials or welding procedures, and for allowing the housings 30 to be rotated in concert with the ball nut 20 relative to the screw shaft 10.

The housings 30 each include a number of (such as three pairs of) radially extended slots 34 formed therein and longitudinally or axially spaced from each other, and communicative with the bore 31 of the housing 30 and opened outwardly for engaging with the wiper members 50 respectively, it is preferable that the second pair of the slots 34 of the housing 30 are arranged 90 degrees offset from the first pair and the third pair of the slots 34, and the fourth pair of the slots 34 of the housing 30 are arranged 90 degrees offset from the third pair and the fifth pair of the slots 34, and vice versa. One or more pairs or some or all of the wiper members 50 each include a brush or wiper element 51 extended or engaged into the bore 31 of the housing 30 for engaging into the helical threaded portions or grooves 11 of the screw shaft 10 and for wiping off the dust or dirt and for preventing the dust or dirt from entering into the space between the ball nut 20 and the screw shaft 10.

Figure 6:
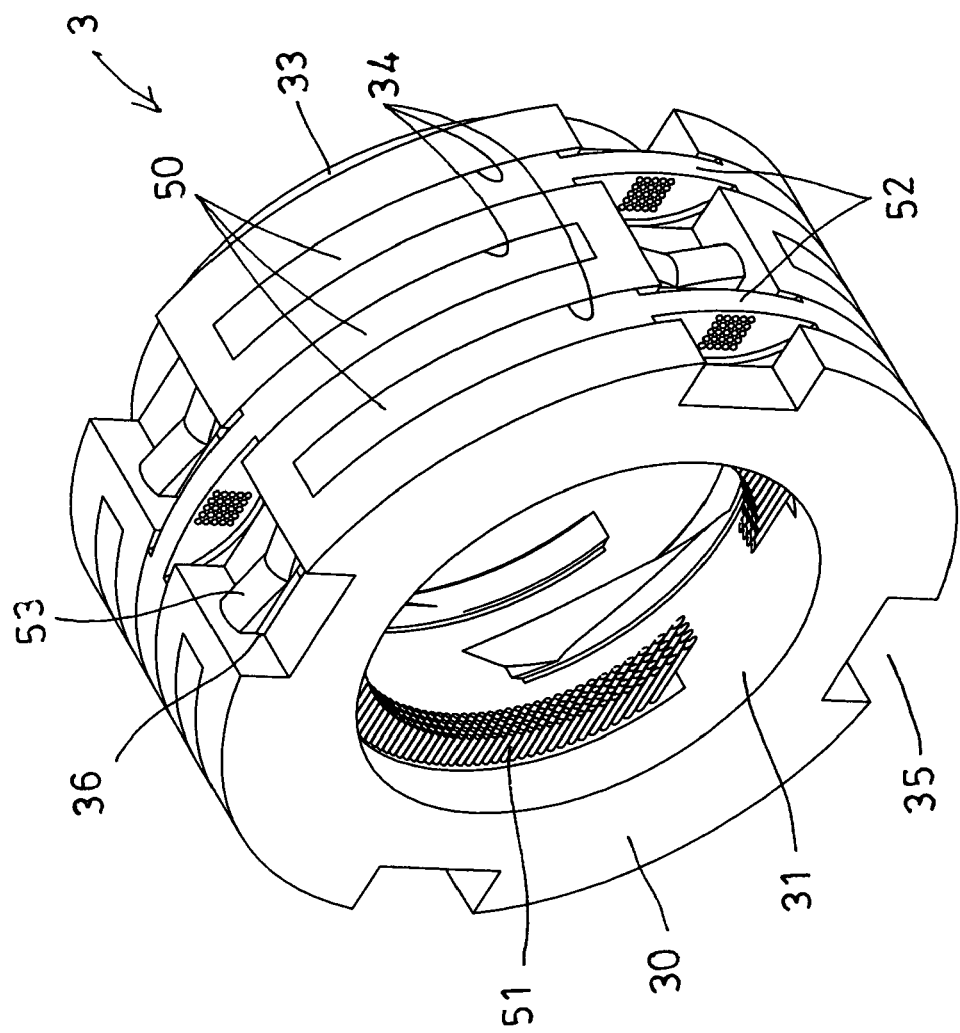
FIG. 6 is a perspective view of the dustproof device for the ball screw apparatus.
Figure 7:
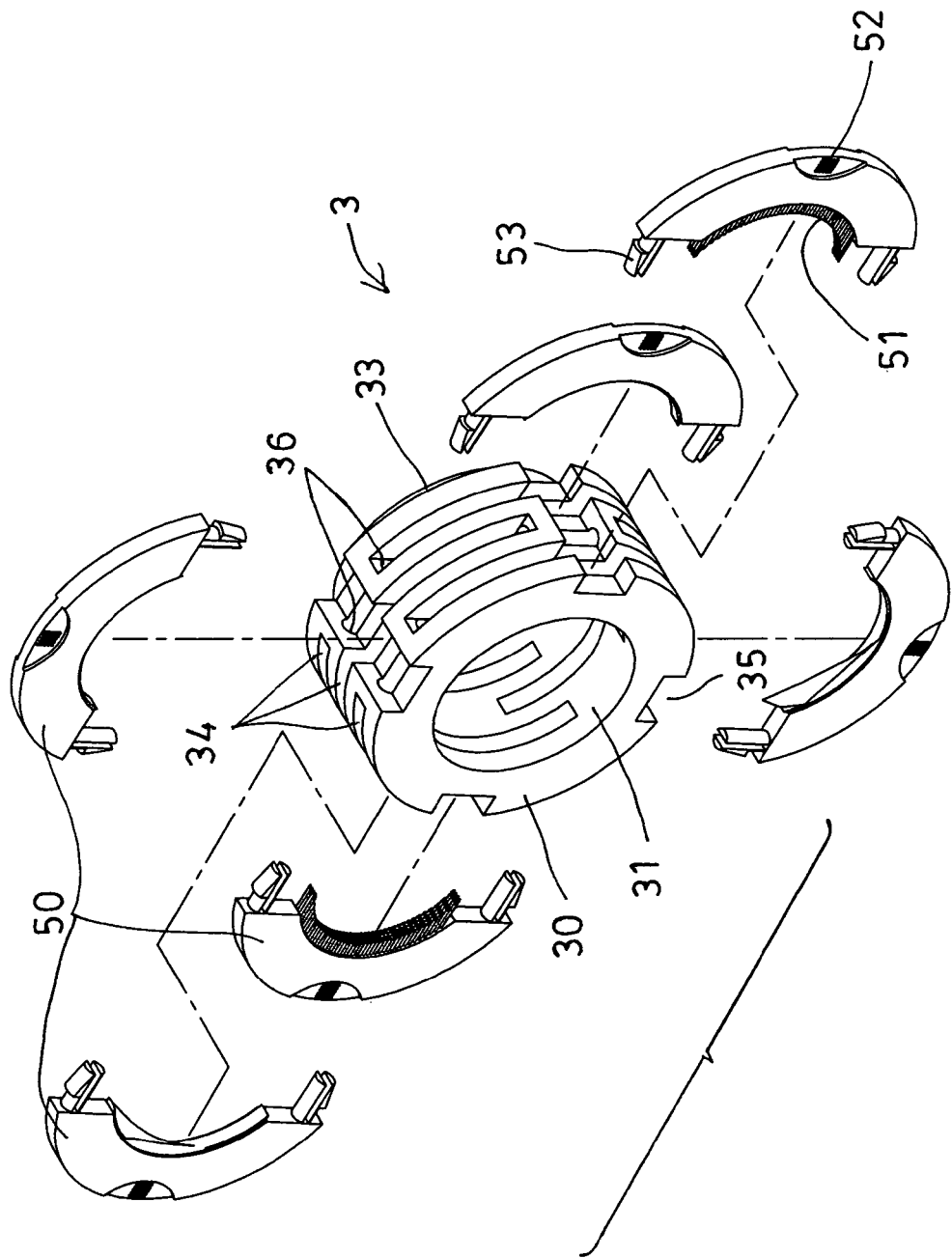
FIG. 7 is a partial exploded view of the dustproof device for the ball screw apparatus.

The wiper members 50 each include a curved structure, such as a substantially semi-circular structure, and each pair of the wiper members 50 include two curved wiper members 50 disposed or arranged opposite to each other and aligned with each other or located in the same plan for forming a substantially circular structure, and every two adjacent pair of the wiper members 50 are longitudinally or axially spaced from each other, and are arranged 90 degrees offset from each other, best shown in FIGS. 6, 7, for allowing the wiper or brush element 51 to suitably engage into the helical threaded portions or grooves 11 of the screw shaft 10 and for suitably wiping off the dust or dirt that is engaged into or that enters into the helical threaded portions or grooves 11 of the screw shaft 10.

The housings 30 each further include one or more (such as four) channels 35 longitudinally or axially formed in the outer peripheral portion thereof, and intersecting or communicating with the slots 34 of the housing 30 for partially exposing the wiper members 50. For example, the wiper members 50 each include a knob or handgrip 52 formed or provided thereon, such as formed on the middle portion thereof and aligned with the channels 35 of the housing 30 for allowing the handgrips 52 of the wiper members 50 to be exposed and for allowing the wiper members 50 to be grasped and held by the user and to be engaged into or disengaged from the slots 34 of the housing 30. The housings 30 each further include a number of lock notches 36 (FIGS. 4-7) formed therein and communicative with the slots 34 and/or the channels 35 of the housing 30, and the wiper members 50 each include one or more (such as two) tongues or latches 53 extended therefrom for engaging with the lock notches 36 of the housing 30 and for detachably attaching or mounting the wiper members 50 to the housing 30 and arranged for allowing the wiper members 50 to be detached or disengaged from the housing 30 by depressing the latches 53 (FIG. 6).

Figure 4:
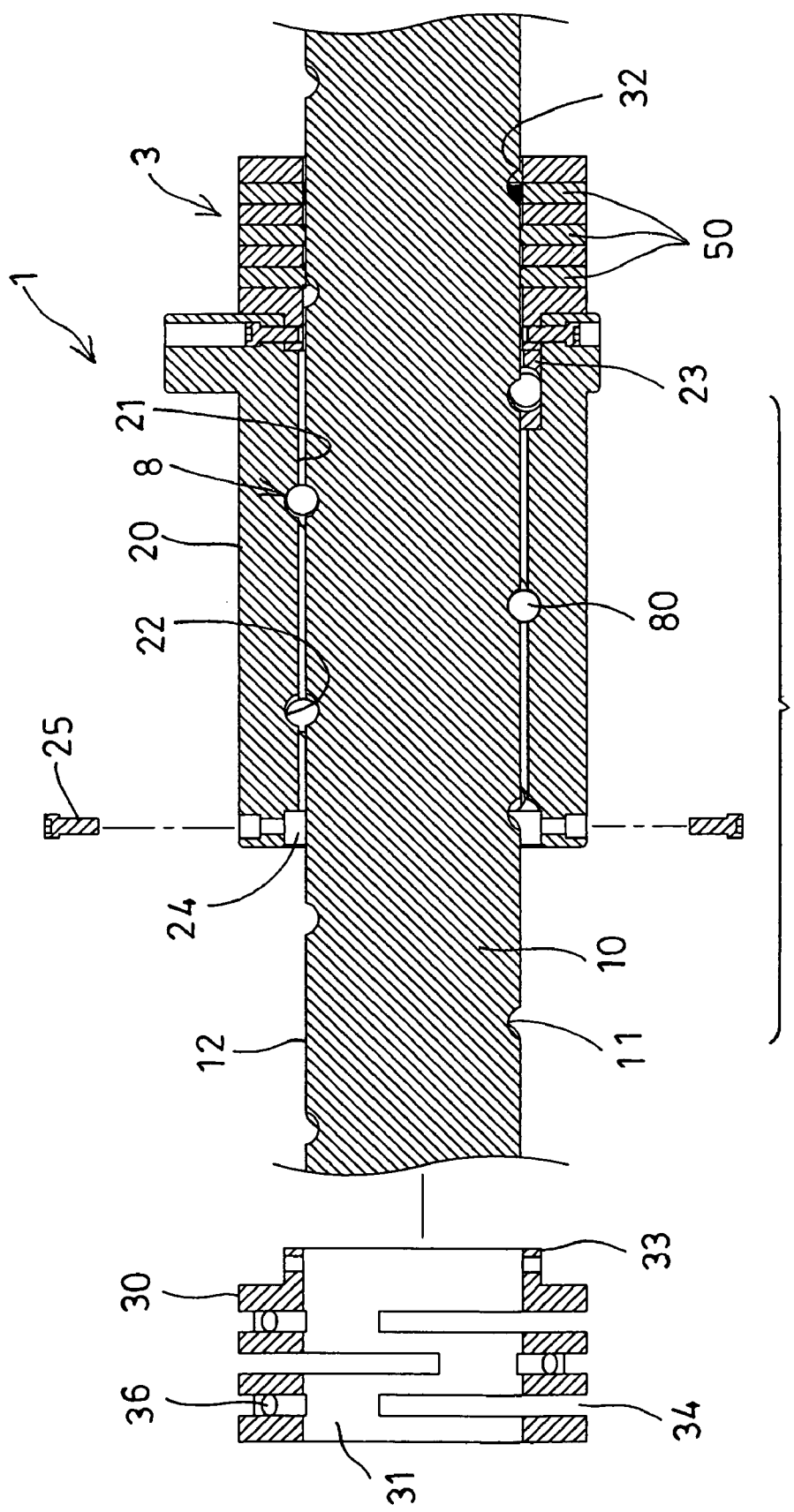
FIGS. 4, 5 are partial exploded and cross sectional views FIG. 3, illustrating the operation of the dustproof device for the ball screw apparatus.
Figure 5:
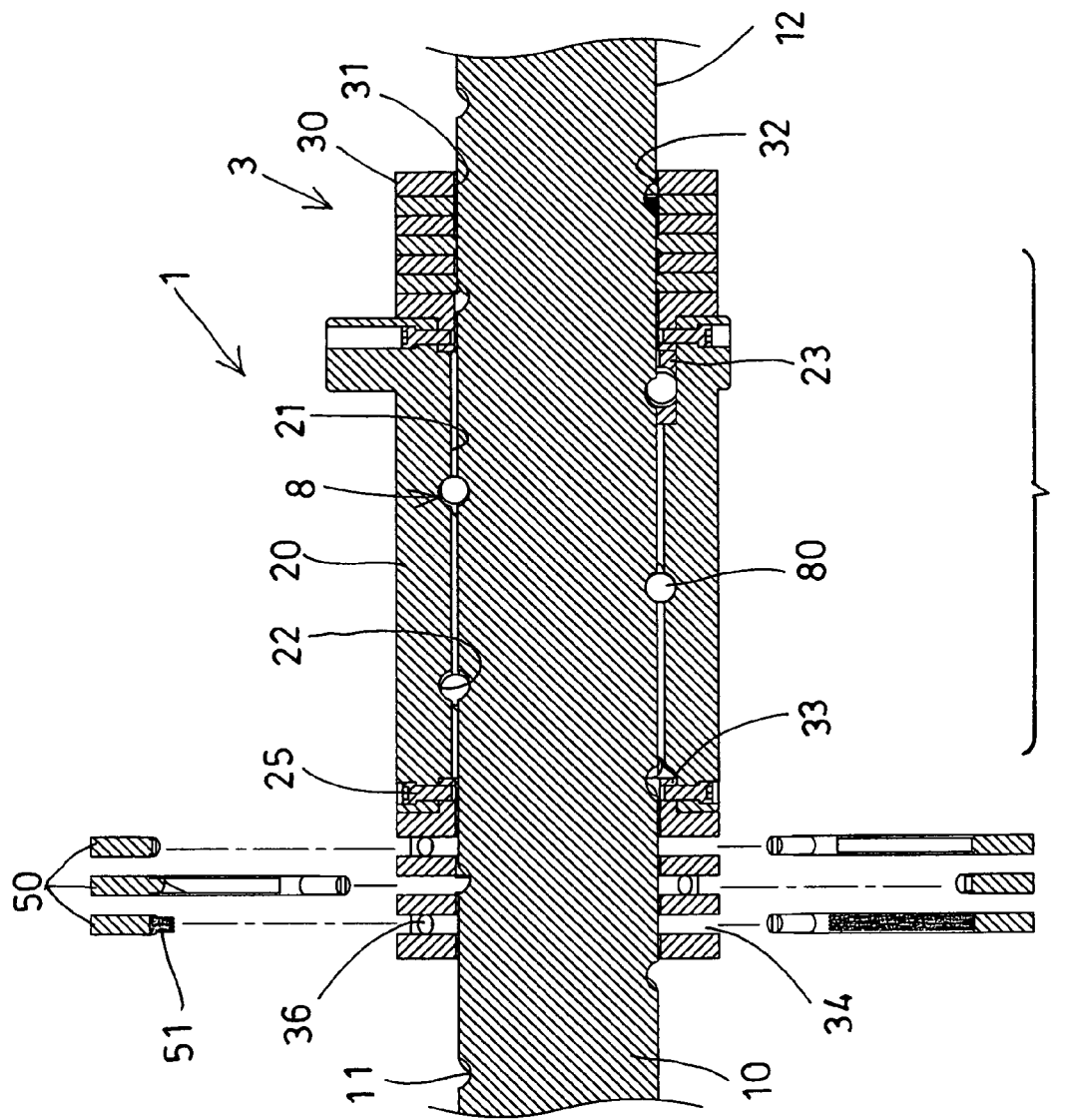

In operation, as shown in FIG. 4, the housings 30 of the dustproof device 3 may be easily and readily attached or mounted to the ball nut 20 with the latches or fasteners 25, and the selected number of the wiper members 50 may be selectively attached or mounted or engaged into the slots 34 of the housing 30 (FIGS. 1. 3. 5), and one or more of the wiper members 50 may include the wiper or brush element 51 formed or provided thereon (FIGS. 5-7) for engaging into the helical threaded portions or grooves 11 of the screw shaft 10 and for wiping off the dust or dirt and for preventing the dust or dirt from entering into the space between the ball nut 20 and the screw shaft 10.

It is to be noted that the selected number of the wiper members 50 may be selectively or changeably attached or mounted or engaged into the slots 34 of the housing 30, and particularly the selected number of the wiper members 50 that include the wiper or brush element 51 formed or provided thereon may be selectively or changeably attached or mounted or engaged into the slots 34 of the housing 30 for suitably shielding the side or end portions of the ball nut 20 and for wiping off the dust or dirt from the helical threaded portions or grooves 11 of the screw shaft 10 and thus for preventing the dust or dirt from entering into the helical threaded portions or grooves 11 of the screw shaft 10 and thus for preventing the ball bearing members 80 from being damaged by the dust or dirt.

Accordingly, the ball screw apparatus in accordance with the present invention includes a dust cap or dustproof device easily and readily attached to the ball nut for suitably shielding the side or end portions of the ball nut and for preventing dust or dirt from entering into the space between the ball nut and the screw shaft.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A ball screw apparatus comprising:
   an elongated screw shaft including a helical groove formed on an outer peripheral surface thereof,
   a ball nut movably attached onto said elongated screw shaft, and including a bore formed therein for receiving said elongated screw shaft, and including a helical groove formed therein for engaging with said helical groove of said screw shaft and for forming an endless ball guiding passage between said screw shaft and said ball nut,
   a plurality of ball bearing members received in said endless ball guiding passage that is formed between said screw shaft and said ball nut for facilitating a movement between said screw shaft and said ball nut,
   a housing attached to said ball nut and moved in concert with said ball nut, and including a bore formed therein for receiving said elongated screw shaft, and including a slot formed therein and communicative with said bore of said housing, said housing including a second slot formed therein and disposed and arranged opposite to said slot of said housing and aligned with said slot of said housing for forming a circular structure together with said slot of said housing, and
   a wiper member engaged into said slot of said housing and including a wiper element provided thereon and engaged into said bore of said housing for engaging into said groove of said elongated screw shaft and for wiping off a dirt from said helical groove of said screw shaft and for preventing the dirt from entering into said helical groove of said screw shaft.

2. The ball screw apparatus as claimed in claim 1, wherein said slot of said housing is a radially extended slot.

3. The ball screw apparatus as claimed in claim 1, wherein said housing includes at least one second slot formed therein and axially spaced from said slot of said housing.

4. The ball screw apparatus as claimed in claim 1, wherein said ball nut includes a peripheral recess formed in one side of said ball nut, and said housing includes a peripheral flange extended outwardly from one side of said housing for engaging into said peripheral recess of said ball nut.

5. A ball screw apparatus comprising:
   an elongated screw shaft including a helical groove formed on an outer peripheral surface thereof,
   a ball nut movably attached onto said elongated screw shaft, and including a bore formed therein for receiving said elongated screw shaft, and including a helical groove formed therein for engaging with said helical groove of said screw shaft and for forming an endless ball guiding passage between said screw shaft and said ball nut,
   a plurality of ball bearing members received in said endless ball guiding passage that is formed between said screw shaft and said ball nut for facilitating a movement between said screw shaft and said ball nut,
   a housing attached to said ball nut and moved in concert with said ball nut, and including a bore formed therein for receiving said elongated screw shaft, and including a slot formed therein and communicative with said bore of said housing, said housing including a channel formed therein and communicative with said slot of said housing, and
   a wiper member engaged into said slot of said housing and including a wiper element provided thereon and engaged into said bore of said housing for engaging into said groove of said elongated screw shaft and for wiping off a dirt from said helical groove of said screw shaft and for preparing the dirt from entering into said helical groove of said screw shaft, and said wiper member including a handgrip aligned with said channel of said housing for being grasped and held by a user.

6. A ball screw apparatus comprising:
   an elongated screw shaft including a helical groove formed on an outer peripheral surface thereof,
   a ball nut movably attached onto said elongated screw shaft, and including a bore formed therein for receiving said elongated screw shaft, and including a helical groove formed therein for engaging with said helical groove of said screw shaft and for forming an endless ball guiding passage between said screw shaft and said ball nut,
   a plurality of ball bearing members received in said endless ball guiding passage that is formed between said screw shaft and said ball nut for facilitating a movement between said screw shaft and said ball nut,
   a housing attached to said ball nut and moved in concert with said ball nut, and including a bore formed therein for receiving said elongated screw shaft, and including a slot formed therein and communicative with said bore of said housing, said housing including at least one lock notch formed therein and communicative with said slot of said housing, and
   a wiper member engaged into said slot of said housing and including a wiper element provided thereon and engaged into said bore of said housing for engaging into said groove of said elongated screw shaft and for wiping off a dirt from said helical groove of said screw shaft and for preventing the dirt from entering into said helical groove of said screw shaft, and said wiper member including a latch extended therefrom for engaging with said at least one lock notch of said housing and for detachably mounting said wiper member to said housing.

* * * * *